(12) United States Patent
Kane

(10) Patent No.: US 8,538,792 B1
(45) Date of Patent: Sep. 17, 2013

(54) METHOD AND SYSTEM FOR DETERMINING TOTAL COST OF OWNERSHIP

(75) Inventor: Derek Kane, Dublin, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 13/456,907

(22) Filed: Apr. 26, 2012

(51) Int. Cl.
*G06Q 40/00* (2012.01)

(52) U.S. Cl.
USPC ............................. 705/7.11; 705/7.42

(58) Field of Classification Search
USPC ................................. 705/7.11, 7.42
See application file for complete search history.

(56) References Cited

U.S. PATENT DOCUMENTS

| | | | |
|---|---|---|---|
| 5,485,574 | A | 1/1996 | Bolosky et al. |
| 5,745,880 | A | 4/1998 | Strothmann et al. |
| 5,771,179 | A | 6/1998 | White et al. |
| 5,793,632 | A | 8/1998 | Chackman et al. |
| 5,893,082 | A | 4/1999 | McCormick |
| 5,960,417 | A | 9/1999 | Lin et al. |
| 6,157,916 | A | 12/2000 | Hoffman |
| 6,219,654 | B1 | 4/2001 | Ruffin |
| 7,020,621 | B1 | 3/2006 | Feria et al. |
| 7,474,218 | B2 | 1/2009 | Johnson et al. |
| 7,496,532 | B2 | 2/2009 | Johnson et al. |
| 7,852,222 | B2 | 12/2010 | Johnson et al. |
| 8,230,095 | B2 | 7/2012 | Calomeni et al. |
| 8,332,266 | B2 | 12/2012 | Doeberl et al. |
| 2002/0004912 | A1 | 1/2002 | Fung |
| 2002/0016757 | A1 | 2/2002 | Johnson et al. |
| 2003/0158765 | A1* | 8/2003 | Ngi et al. ..................... 705/7 |
| 2005/0033629 | A1 | 2/2005 | Forman et al. |
| 2005/0071286 | A1 | 3/2005 | Laicher et al. |
| 2005/0071348 | A1 | 3/2005 | Jakowski |
| 2006/0031547 | A1 | 2/2006 | Calomeni et al. |
| 2007/0168874 | A1 | 7/2007 | Kloeffer et al. |
| 2009/0072977 | A1 | 3/2009 | Johnson et al. |
| 2009/0119305 | A1 | 5/2009 | Johnson et al. |
| 2009/0228377 | A1 | 9/2009 | Rohdemann et al. |
| 2012/0060142 | A1 | 3/2012 | Etchin et al. |
| 2012/0259958 | A1 | 10/2012 | Calomeni et al. |

FOREIGN PATENT DOCUMENTS

| | | |
|---|---|---|
| WO | WO 00/14667 | 3/2000 |
| WO | WO2013/061324 | 5/2013 |

* cited by examiner

*Primary Examiner* — Thomas Dixon
*Assistant Examiner* — Benjamin S Fields
(74) *Attorney, Agent, or Firm* — Goodwin Procter LLP

(57) ABSTRACT

Embodiments of the present invention are directed to a total cost of ownership method and system for technology components, applications or business units. The system provides financial reporting costs in information technology terms in order to build a bridge between technology and finance organizations. The method and system utilize data from systems of record for assets and charges, extract this data and deliver output reports and visualizations on the data processing and analysis in order to drive a Total Cost of Ownership for technology components, applications or business units. The method includes bringing data from disparate sources into the computer processor accessing at least one storage medium, validating the data by a Data Quality Engine, processing the data by matching the at least one charge to the at least one asset and performing data analytics and reporting on the Total Cost of Ownership.

33 Claims, 10 Drawing Sheets

TCO Automation Output

505

Asset Name: DK1S234      510

Total Charges: $ 10,000.00

515

Associated Applications:

520a

520 — MindyTrade  (0.75 Weight Factor)  520b

Assigned Charges: $ 7,500.00

525a

525 — KaneNet  (0.25 Weight Factor)  525b

Assigned Charges: $ 2,500.00

May 1, 2011                               Page 1 of 1

FIG 5A

TCO Automation Output

550

Asset Name: DK1W123     555

Total Charges: $ 10,000.00     560

Associated Applications:     565

570  CarsonMart     570a

Assigned Charges: $ 5,000.00

575  DaltonWare     575a

Assigned Charges: $ 5,000.00

May 1, 2011                                      Page 1 of 1

FIG 5B

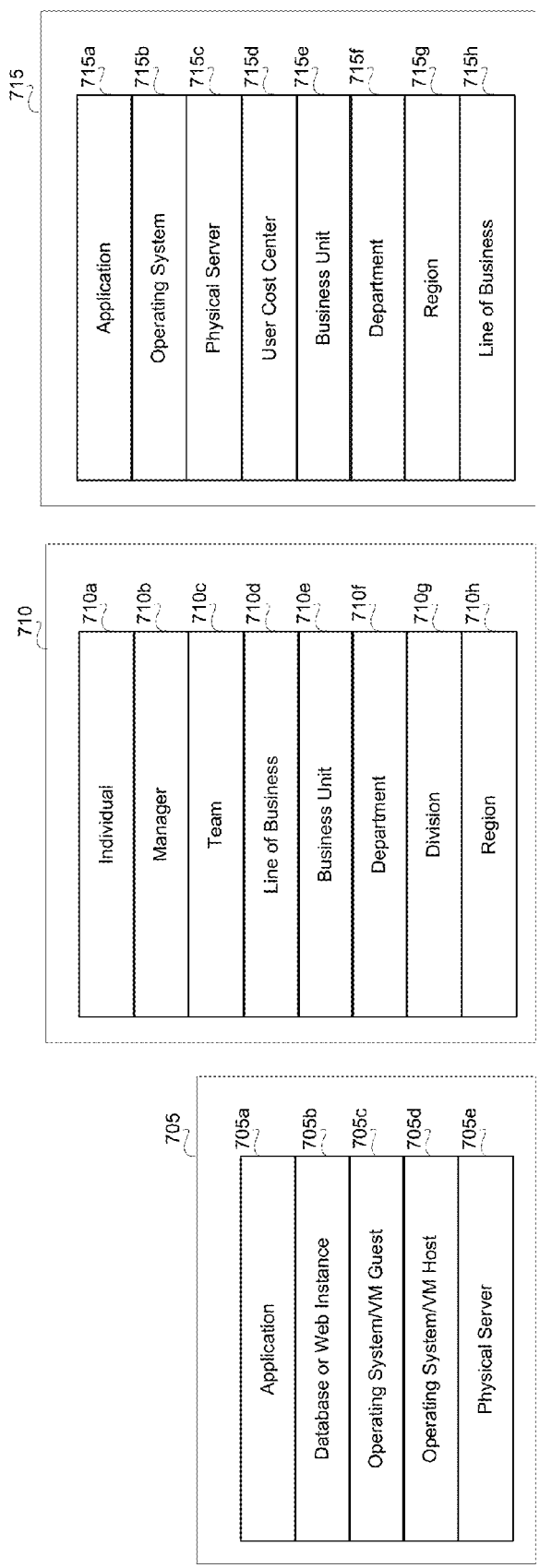

METHOD AND SYSTEM FOR DETERMINING TOTAL COST OF OWNERSHIP

TECHNICAL FIELD

Embodiments of the invention are related generally to systems and methods for determining the Total Cost of Ownership by automating the delivery of charges matched to assets and allocated to a quality technology component using available data sources.

BACKGROUND OF THE INVENTION

Total Cost of Ownership ("TCO") is an estimate whose purpose is to help consumers and enterprise managers determine direct and indirect charges of a product or system. A TCO analysis identifies total charges of an asset used by an application and allocates charges to customers who use the application. An example of TCO analysis is identification of total costs of technology used by Investment Management in order to charge back the identified cost for that technology to customers implementing the technology. TCO analysis is used to support acquisition and planning decisions for a wide range of assets that bring significant maintenance or operating costs across a long usable life.

Although few processes and systems are available for providing financial reporting costs in information technology terms, the existing art is deficient because current cost allocation systems fail to facilitate proper communication between, for instance, a finance department and a technology team, thus failing to provide an efficient bridge between technology and finance organizations. This process is complicated by financial staff communicating in non-technical financial terms and technical staff communicating in non-financial technical terms. With the current state of the cost allocation systems, it is time-consuming and burdensome to collect and process the charge and asset data for determining the total cost of ownership. Furthermore, such computations are typically only performed on a quarterly basis even though data may be available to perform this process more frequently, such as, once per month. Moreover, current systems take more than three full business days to compile the charge and asset data and the process is laborious and manually intensive. The current systems are also subject to human error and prone to inaccuracies because of manual data entry steps. Current systems are also unable to process disparate data, that is, data in different formats and from varied sources such as that from database tables, XML files, TXT files, etc. Therefore, since a subset of data elements is used, full asset and application details are not available under the current systems.

Accordingly, a solution is needed for determining the total cost of ownership that utilizes data from systems of record for information technology assets and financial charges, extracts and processes this data to deliver output reports and visualizations on the data processing and analysis. The solution should automate the delivery and interpretation of the asset and charge data and determine the appropriate weighted charge for the appropriate application(s) associated with the asset. The weighted charge may represent the shared ownership for the applications associated with the asset.

BRIEF SUMMARY OF THE INVENTION

In accordance with exemplary embodiments of the present invention, there is provided a total cost of ownership reporting system that operates over a telecommunications network. In one aspect of the invention, a flexible processing system is provided for determining the total cost of ownership by utilizing data from systems of record for assets and charges. The system implements a computer processor accessing at least one storage medium and comprises interfaces for gathering, validating, processing, analyzing and visualizing information pertaining to assets and charges. The functionality of the TCO system is broken down into four major modules or components: (1) an Extract, Transform and Load (ETL) Engine; (2) a Data Quality Engine; (3) a Charge Processing Engine and (4) an Analytics, Reporting and Data Visualization Engine. After relevant asset and charge data is extracted from system(s) of record using the ETL Engine, the Data Quality Engine interprets asset information and combines it with charge information in order to validate and import appropriate data fields. The Charge Processing Engine then matches asset and charge data in order to interpret appropriate weighted charge for an appropriate configuration item. Configuration items may be Information Technology (IT) assets such as Applications, Operating Systems, Physical Servers, Virtual Hosts, Virtual Machines (VM), Databases, Web Instances, Java (or other Application) Virtual Machines, or other IT assets. Configuration items may also be business assets such as Lines of Business, Business Units (distribution, equity, retail, etc.), Regions (Americas, Europe/Middle East/Africa, Asia Pacific, etc.), Divisions, Departments, Teams, Managers, Individuals (employee/staff member) and/or or any other custom configurable items. The Visualization Engine may then subsequently deliver output reports and visualizations on the data processing and analysis in order to drive a TCO analysis for the assets, for example, technology components, applications or business units.

In a further aspect of the invention, a computer-implemented method is provided for determining the Total Cost of Ownership implementing a computer processor accessing at least one storage medium. The method comprises gathering and extracting asset and charge data from system(s) of record, the data being from disparate data sources and in varied formats. The method further includes validating the data and performing analysis, data munging and data improvement activities on it. The method also includes matching the asset and charge data in order to interpret the appropriate weighted charges for the appropriate configuration item. Configuration items may be IT assets such as Applications, Operating Systems, Physical Servers, Virtual Hosts, Virtual Machines, Databases, Web Instances, Java (or other Application) Virtual Machines, or other IT assets. Configuration items may also be business assets such as Lines of Business, Business Units (distribution, equity, retail, etc.), Regions (Americas, Europe/Middle East/Africa, Asia Pacific, etc.), Divisions, Departments, Teams, Managers, Individuals (employee/staff member) and/or or any other custom configurable items. The method further includes delivering output reports and visualizations on the data processing and analysis in order to drive a TCO analysis for the assets, for example, technology components, applications or business units.

BRIEF DESCRIPTION OF THE DRAWINGS

The present invention is described in detail below with reference to the attached drawings figures, wherein:

FIG. 5A is an exemplary embodiment of an output from the TCO system; and

FIG. 5B is an exemplary embodiment of an output from the TCO system.

FIG. 7A is an exemplary embodiment of the hierarchical matching criteria utilized by the TCO system.

FIG. 7B is an exemplary embodiment of the hierarchical matching criteria utilized by the TCO system.

FIG. 7C is an exemplary embodiment of the hierarchical matching criteria utilized by the TCO system.

DETAILED DESCRIPTION OF PREFERRED EMBODIMENTS

Embodiments of the present invention are directed to a total cost of ownership method and system for technology components, applications or business units. The system provides financial reporting costs in information technology terms in order to build a bridge between technology and finance organizations. Embodiments of the system utilize data from systems of record for information technology assets and financial charges, extract and process this data to deliver output reports and data visualizations on the data processing and analysis in order to drive a Total Cost of Ownership for assets, for example, technology components, applications or business units.

Figure 1A:
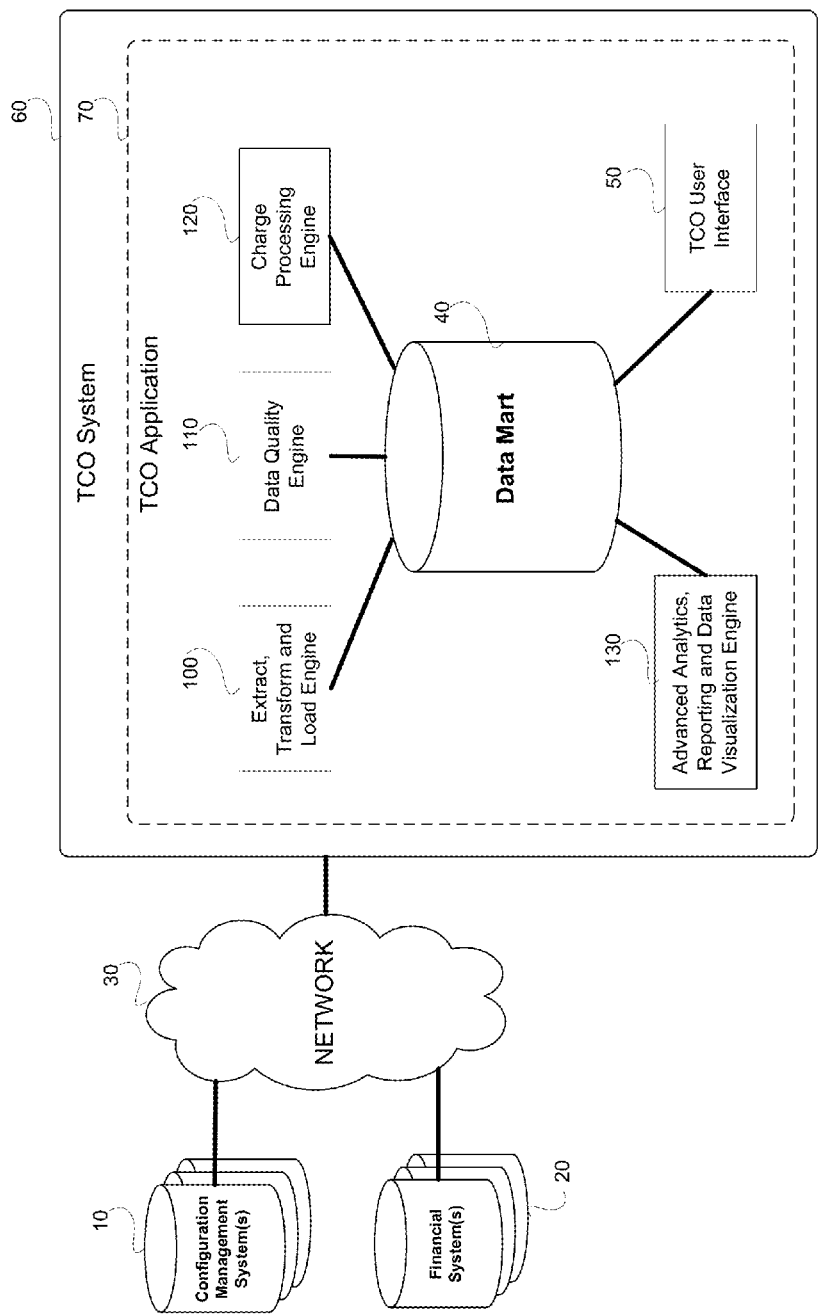
FIG. 1A is a block diagram illustrating an operating environment for a Total Cost of Ownership system in accordance with an embodiment of the invention.

FIG. 1A is a block diagram illustrating an operating environment for a Total Cost of Ownership system in accordance with an embodiment of the invention. The TCO System 60 includes a TCO Application 70. The TCO System 60 is connected through a communications medium over a Network 30, such as the internet, an intranet, a local-area-network (LAN), a wide-area-network (WAN), etc, to one or more Configuration Management System(s) 10 and one or more Financial System(s) 20.

The Configuration Management System(s) 10 may provide data for IT assets such as Applications, Operating Systems, Physical Servers, Virtual Hosts, Virtual Machines, Databases, Web Instances, Java (or other Application) Virtual Machines, or business assets such as Lines of Business, Business Units (distribution, equity, retail, etc.), Regions (Americas, Europe/Middle East/Africa, Asia Pacific, etc.), Divisions, Departments, Teams, Managers, Individuals (employee/staff member) and/or or any other custom configurable items. The Financial System(s) 20 may provide charges and charges details data, such as dollar amounts that reflect the cost incurred by an asset.

The TCO Application 70 includes a Data Mart 40, an Extract, Transform and Load Engine 100, a Data Quality Engine 110, a Charge Processing Engine 120, an Analytics, Reporting and Data Visualization Engine 130 and a TCO User Interface 50. The TCO Application 70 may bring data from the Configuration Management System(s) 10 and the Financial System(s) 20 using the Extract, Transform and Load Engine 100 in the form of data feeds. The data may then be uploaded in the Data Mart 40. The Data Mart 40 may not be the system of record for the data brought from the Configuration Management System(s) 10 and the Financial System(s) 20. In an embodiment of the invention, the Data Mart 40 may be a database that is local to the TCO System 60 and that stores data to be used by the TCO Application 70 to perform the TCO analysis. Once the data feeds are configured or data is uploaded, the ETL Engine 100 may identify data formatting in the source data by performing initial asynchronous scans of the data. The Data Quality Engine 110 may then analyze and perform data munging and data improvement activities to aid in the identification of data fields that should be imported. As the ETL Engine 100 continues to scan deeper into the data, the Data Quality Engine 110 may learn and improve its recommendation of the data fields suitable for import. The Charge Processing Engine 120, may then process charge and asset data by matching the assets to charges using a hierarchical matching criteria. The results of processing of the charge and asset data may be stored in the Data Mart 40. Once the assets and charges have been matched, the Analytics, Reporting and Data Visualization Engine 130, may then operate similarly to the Data Quality Engine 110 to asynchronously scan the data in the Data Mart 40 for reporting and output. Embodiments may also include standard reporting features available through a TCO User Interface 50 that may allow users to choose out of the box reports or create ad hoc reports.

Figure 1B:
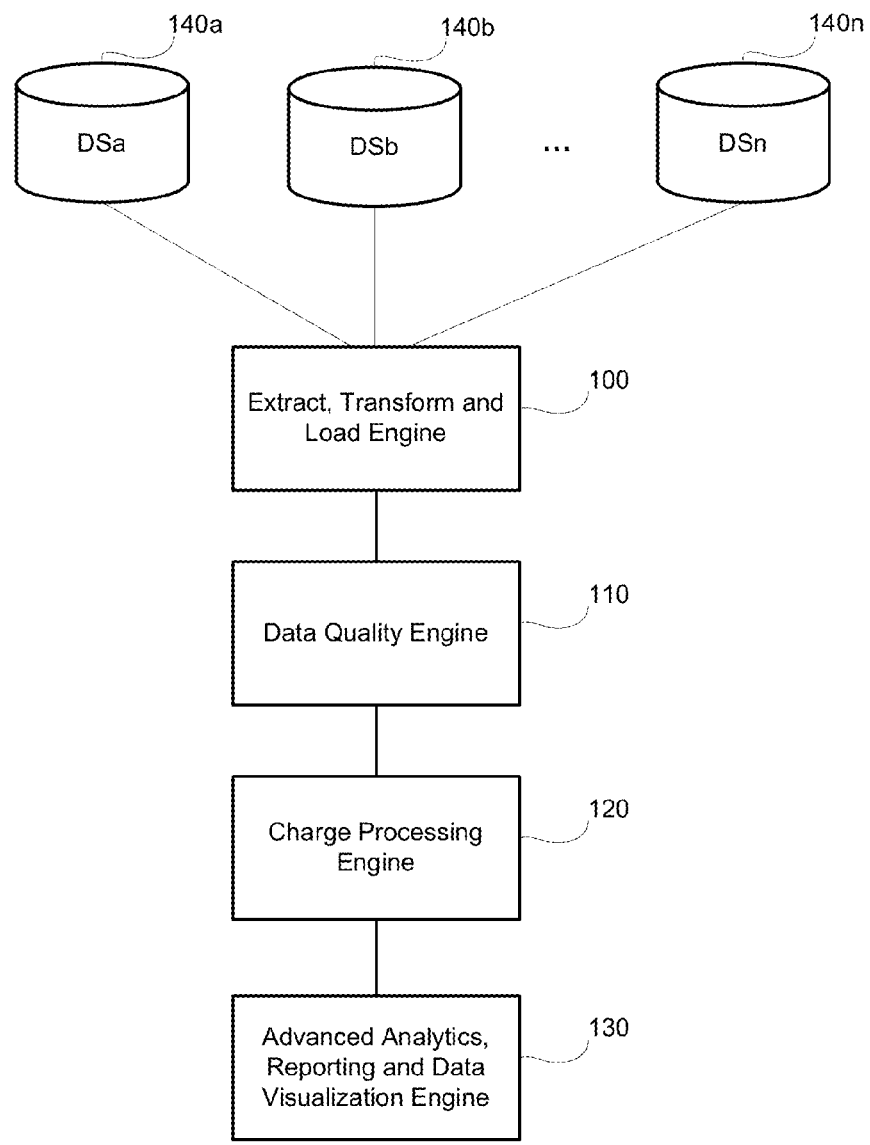
FIG. 1B is a flow chart illustrating a system for determining the Total Cost of Ownership in accordance with an embodiment of the invention.

FIG. 1B is a flow chart illustrating a system for determining the total cost of ownership in accordance with an embodiment of the invention. One or more processors may be used in accordance with the various embodiments of the invention. The system contains an ETL Engine 100 for bringing data feeds from disparate data sources 140a, 140b . . . 140n (DSa, DSb . . . DSn) into the TCO application. Examples of data sources include, but are not limited to, databases containing information about Applications, Operating Systems, Physical Servers, Virtual Hosts, Virtual Machines, Databases, Web Instances, Java (or other Application) Virtual Machines, Lines of Business, Business Units (distribution, equity, retail, etc.), Regions (Americas, Europe/Middle East/Africa, Asia Pacific, etc.), Divisions, Departments, Teams, Managers, Individuals (employee/staff member) and/or or any other custom configurable items.

The ETL Engine 100 is flexible enough to handle most data formats that are fed into it. Examples for data formats include, but are not limited to, database tables, XML, TXT, CSV, etc. Once the data feeds are configured or data is uploaded, the ETL Engine 100 may identify data formatting in the source data by performing initial asynchronous scans of the data. The operation of the ETL Engine 100 is described in greater detail below with reference to FIG. 2.

Another component of the system, the Data Quality Engine 110, is a data validation interface that may be configured to identify variances in the data feeds compared to previous executions of the Data Quality Engine 110. The Data Quality Engine 110 may analyze and perform data munging and data improvement activities to aid the developer in defining which fields of data should be imported. Examples of data fields marked for import include, but are not limited to, asset identifier, asset location, asset usage amount, user identifier, user group, etc. In one embodiment of the invention, all the data records in the data feed are marked for import. Embodiments of the invention may also include marking a subset of the data records in the data feed for import.

The Date Quality Engine 110 may also be able to, for instance, identify faulty records. Faulty records are records that have failed to "map" on the system and records that are faulty or improper for some other reason. The Data Quality Engine 110 may have a job failure management mechanism that will allow jobs and data sets to be marked as faulty and allow them to be taken out of the data import process. A job may be defined as a task for importing one or more datasets from a data source. In one embodiment of the invention, the Data Quality Engine 110 may adopt a data learning process that may utilize not only column header information but also column format information to aid in data import. As the ETL Engine 100 continues to scan deeper into the data source, the Data Quality Engine 110 may learn and improve its recommendation of the data fields suitable for import. Typically, the more data that is fed into the system and the more time that is spent analyzing the data, the higher quality recommendations the Data Quality Engine 110 may be able to make. In one embodiment of the invention, the Data Quality Engine 110 may perform in an entirely automated manner without requiring user intervention. Embodiments may also include the Data Quality Engine 110 performing in a quasi-automated manner with requiring some user intervention. Embodiments may also include the Data Quality Engine 110 performing recommendation of the source data in an entirely manual manner with the user specifying which data fields to import.

An additional system component, the Charge Processing Engine 120, may process charge and asset data. In the Charge Processing Engine 120, charges may be matched to assets using a hierarchical matching criteria. Examples of type of charges include, but are not limited to, financial charges, resource utilization charges and charges that reflect the benefit associated with an asset. In one embodiment of the invention, the financial charges are in U.S. Dollar amounts. Embodiments of the invention may also include configuring the currency unit of the financial charge to handle various currency types including, but not limited to, Canadian Dollar, Euro, Indian Rupee, etc. Embodiments may also include the handling of currency fluctuations and processing of charges based on multiple currency types.

Embodiments of the invention include a hierarchical matching criteria list containing the following IT assets to be matched to charges: Applications, Operating Systems, Physical Servers, Virtual Hosts, Virtual Machines, Databases, Web Instances, Java (or other Application) Virtual Machines or any other custom configurable asset. An embodiment of a hierarchical matching criteria list is described in greater detail with reference to FIG. 7A below. The Charge Processing Engine 120 may also allocate charges to assets in a hierarchical matching criteria list containing the following business assets: Lines of Business, Business Units (distribution, equity, retail, etc.), Regions (Americas, Europe/Middle East/Africa, Asia Pacific, etc.), Divisions, Departments, Teams, Managers, Individuals (employee/staff member) and/or other custom designations or groupings specific to the business. An embodiment of a hierarchical matching criteria list is described in greater detail with reference to FIG. 7B below. Embodiments of the invention may also include the Charge Processing Engine 120 allocating the charge to an asset based on regulatory rules and procedures. The Charge Processing Engine 120 may operate by 'traversing the entire asset hierarchy,' that is, walking up and down the asset metadata from server all the way up to the application level, and performing data analysis and charge splitting at each layer. The goal may be to find the true allocated charge for the highest quality asset that is most closely aligned with the business in order to obtain a true cost of ownership. An embodiment of a method performed by the Charge Processing Engine 120 is described in greater detail with reference to FIG. 3 below.

An additional module, the Analytics, Reporting and Data Visualization Engine 130, may operate similarly to the Data Quality Engine 110 to asynchronously scan the data being imported into the TCO Application 70 for reporting and output. The Analytics, Reporting and Data Visualization Engine 130 may allow for canned or customized reporting. In an embodiment, the reporting may include the following: statistical analyses, trending and predictive modeling, financial trajectory plots, scatter plots and amalgamated life cycle reporting for lines of business, departments or other logical business unit groupings. Embodiments may also include standard reporting features available through a user interface that allows users to choose out of the box reports or create ad hoc reports. In this manner, the users may be able to sort, filter, sum, average or perform other operations on the TCO output. Embodiments may also include standard reports for TCO such as Application Cost Reports, Staff Reports and department or any logic business unit summary or detailed reports. Embodiments may also include providing methods to interface with and report to external reporting solutions, including but not limited to, Cognos™, Business Objects™ or any other third party reporting solution. Embodiments may also include data visualization with a portal-like solution where authorized users may utilize data analytics techniques like tree maps, heat maps, scatter plot diagrams, pie charts or line graphs to view the TCO output. Embodiments of the Analytics, Reporting and Data Visualization Engine 130 are described in greater detail with respect to FIG. 4.

In embodiments of the present invention, the TCO system and method may be used to perform trend analysis based on data for a historical period of time. The TCO system and method may also be used to perform sensitivity analysis. Examples of such sensitivity analysis scenarios include, but are not limited to, variations in charges and variations in circumstances. In embodiments of the invention, the TCO system and method may also be used to perform cost-benefit analysis to determine for example, the feasibility of acquiring an asset, modifying the charge allocation structure, modifying the application weights, etc.

Figure 1C:
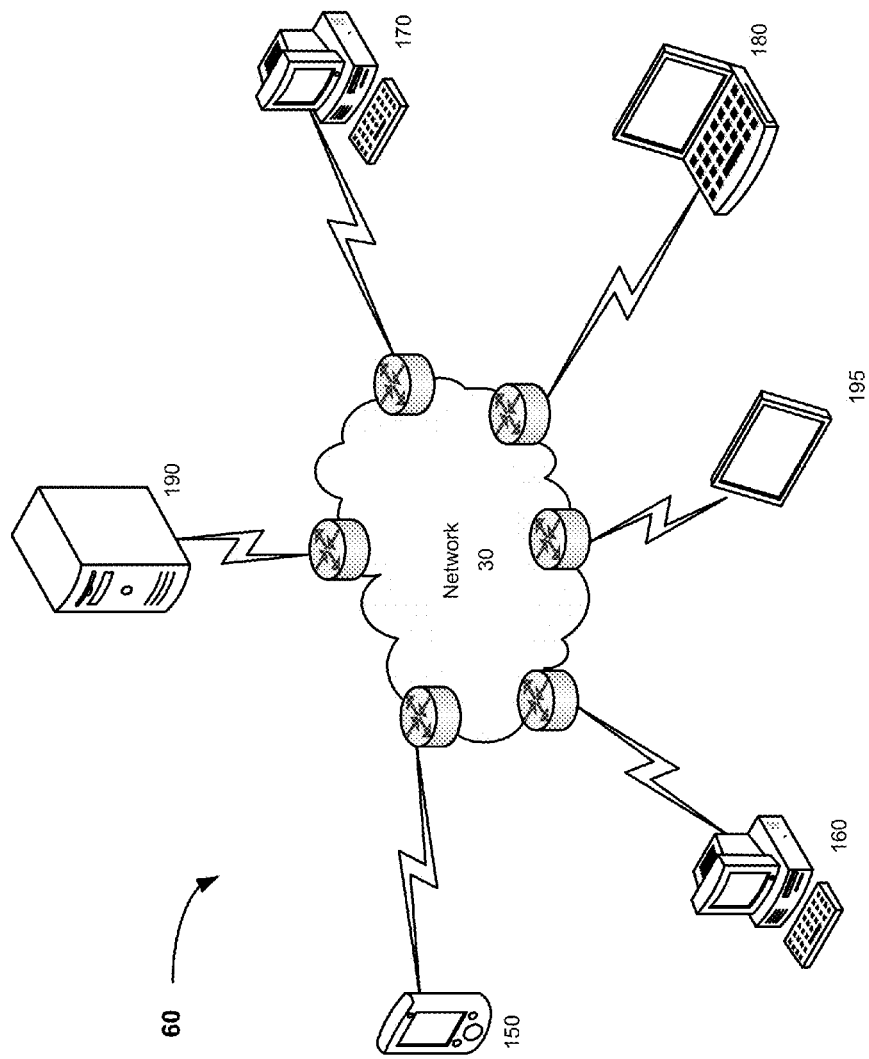
FIG. 1C is a block diagram illustrating an operating environment for a Total Cost of Ownership system in accordance with an embodiment of the invention.

FIG. 1C is a block diagram illustrating an operating environment for a TCO system 60 in accordance with an embodiment of the invention. Those skilled in the art will appreciate that the invention may be practiced with various computer system configurations, including hand-held wireless devices such as mobile phones, smart phones or Personal Digital Assistants (PDAs) 150, multiprocessor systems 160, microprocessor-based or programmable consumer electronics 170, minicomputers 180, mainframe computers 190, Tablets (iPad™, Samsung Galaxy™, etc.) 195, and the like. The invention may also be practiced in distributed computing environments where tasks are performed by remote processing devices that are linked through a communications network. In a distributed computing environment, program modules may be located in both local and remote computer storage media including memory storage devices.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Figure 2:
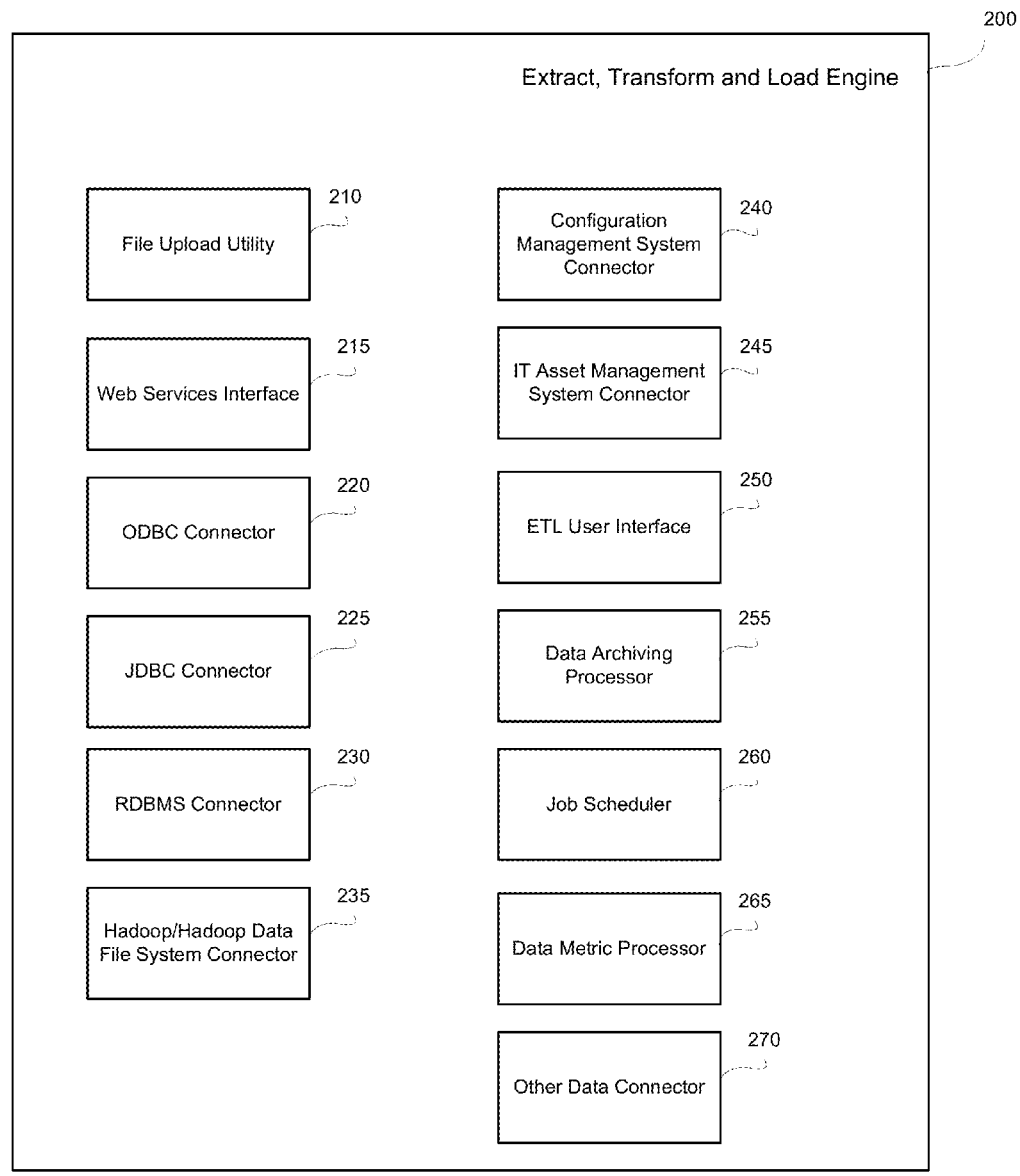
FIG. 2 is an exemplary embodiment illustrating various components of the Extract, Transform and Load Engine.

FIG. 2 is an exemplary embodiment illustrating various components of the ETL Engine 200. The ETL Engine 200 may include any combination of the following modules and in some embodiments may include a greater or lesser number of modules. The ETL Engine 200 may include a File Upload Utility 210 that may be able to aid in the import of files with various data formats. Examples of the data formats include, but are not limited to, XML, CSV and TXT. The ETL Engine 200 may also be able to call one or more Web Services Interfaces 215, including, but not limited to, a Simple Object Access Protocol (SOAP) interface and/or a Representational State Transfer (REST) interface. The ETL Engine 200 may also include one or more Open Database Connectivity (ODBC) connectors 220 and/or one or more Java Database Connectivity (JDBC) connectors 225. The ETL Engine 200 may further include one or more Relational Database Management System (RDBMS) connectors 230 that can connect to one or more relational databases. Examples of relational databases include, but are not limited to, Oracle™, SQL Server™, Sybase™, DB2/UDB™, MySql™ and PostgreSQL™ databases. The ETL Engine 200 may also be able to utilize Hadoop/Hadoop Data File System (HDFS) 235 connectors that can connect to one or more Hadoop/HDFS databases. The ETL Engine 200 may also be able to utilize Other Data Connectors 270 that can connect to other types of databases.

Furthermore, the ETL Engine 200 may contain one or more Configuration Management System connectors 240 to connect to one or more Configuration Management Systems (CMS) or Configuration Management Databases (CMDB). Examples of CMS/CMDB include, but are not limited to, BMC Atrium CMDB™, HP Universal CMDB™, ProcessWorx™, IBM Tivoli Configuration and Change Management Database™, LiveTime CMDB™, CMDBBuild™, or a home grown CMS/CMDB. A custom CMDB configuration portal may provide authorized users with the ability to configure various features of the CMDB system, including the ability to define the fields utilized from the CMDB. The ETL Engine 200 may also contain one or more IT Asset Management System connectors 245 to connect to one or more IT Asset Management Systems. Examples of the IT Asset Management Systems include, but are not limited to, IBM Tivoli Maximo Asset Management, SysAid Asset Management and Express Software Manager™.

Additionally, the ETL Engine 200 may also include a User Interface 250 that may be used to configure the ETL Engine 200. Embodiments of the invention include a web-based user interface. The user interface may provide users the ability to select a data field from a data source to utilize for ETL. The user interface may also contain one or more movable portal components, applets or shuttle controls to provide the ability to customize the fields for ETL by adding or removing single field selections, or all fields selections. The User Interface 250 may also allow the designation of constraints on the data fields. Examples of such constraints include, but are not limited to, primary keys and foreign keys. If no field constraints are specified, the ETL Engine 200 may attempt to extrapolate and match column headers of two or more data source tables by name in order to identify primary and foreign key fields.

The ETL Engine 200 may also include a Data Archiving Processor 255 that may have the ability to dynamically move data to archive tables. The data archiving process may be managed using a configuration user interface. Data may be archived based on a data retention policy that may be subject to change based on system performance, the needs of the finance teams, or other criteria. Furthermore, the ETL Engine 200 may also include a Job Scheduler 260 that may provide the ability to manage jobs, schedules and statuses. Finally, the ETL Engine 200 may also include a Data Metric Processor 265 that may gather data metrics for data import jobs, row counts, sums, averages and variances for key fields and data sets.

Figure 3:
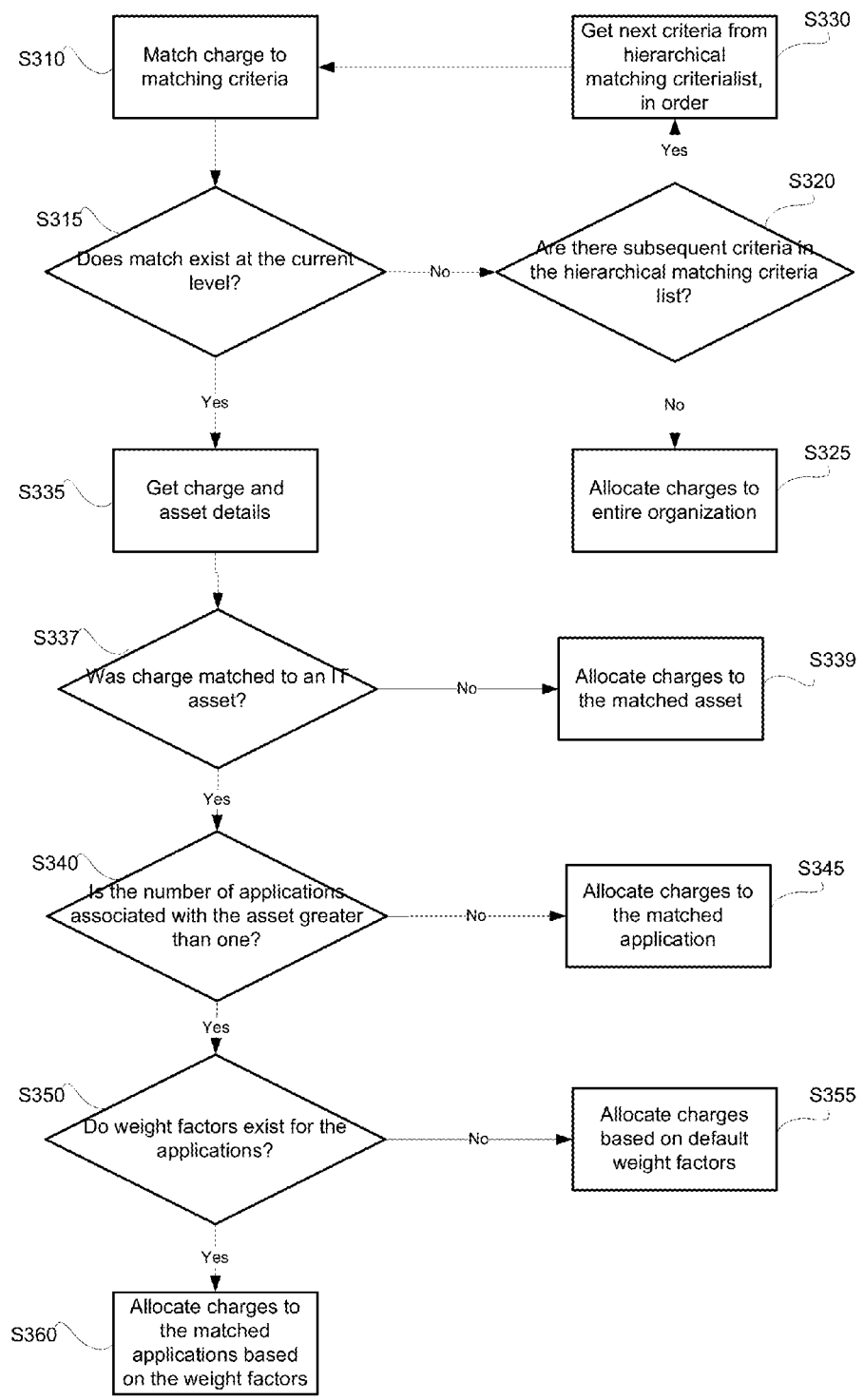
FIG. 3 is a flow chart illustrating the matching process of the Charge Processing Engine in accordance with an embodiment of the invention.

FIG. 3 is a flow chart illustrating an embodiment of the matching process of the Charge Processing Engine. Charges may be matched to an asset using a hierarchical matching criteria list. Examples of type of charges include, but are not limited to, financial charges, resource utilization charges and charges reflecting the benefit associated with an asset.

Embodiments of the invention include a hierarchical matching criteria list containing the following IT assets to be matched to charges: Applications, Operating Systems, Physical Servers, Virtual Hosts, Virtual Machines, Databases, Web Instances, Java (or other Application) Virtual Machines or any other custom configurable asset. An embodiment of a hierarchical matching criteria list is described in greater detail with reference to FIG. 7A below. The Charge Processing Engine 120 can also allocate charges to assets in a hierarchical matching criteria list containing the following business assets: Line of Business, Business Unit (distribution, equity, retail, etc.), Region (Americas, Europe/Middle East/Africa, Asia Pacific, etc.), Division, Department, Team, Manager, Individual (employee/staff member) and/or other custom designation or grouping specific to the business. An embodiment of a hierarchical matching criteria list is described in greater detail with reference to FIG. 7B below. Embodiments of the invention may also include the Charge Processing Engine 120 allocating the charge to an asset based on regulatory rules and procedures.

The process begins in S310 by matching the charge to the first asset in the hierarchical matching criteria list. If the charge is matched to an asset in S315, the system obtains the matched charge and asset details in S335. If a charge is not matched to an asset in S315, the system checks in S320 to see if there are any subsequent assets in the hierarchical matching criteria list that are yet to be compared with the charge. If all the assets have been compared to the charge and a match between the charge and an asset is not obtained, in S325 the charge is allocated to the entire organization, for example, Investment Management. However, if in S320 there are subsequent assets in the hierarchical matching criteria list that have not been compared with the charge, then in S330 the next asset is obtained to match with the charge. Thus, if a charge fails to be matched to a given asset level, then an attempt may be made to match it to a subsequent asset level, in order, until no match between the charge and an asset can be obtained.

If a match between the charge and an asset is obtained in S315 and the matched charge and asset details are gathered in S335, the system determines if, for example, the charges are matched to an IT asset in S337. In an embodiment of the invention, if the asset hierarchy consists of both IT and business assets and the charges are matched to an IT asset, the charges may be allocated to the matched IT asset in S339. However, if instead the charges are not matched to an IT asset in S337, the system determines the number of applications listed for the asset in 5340. If there is only one application associated with the asset, then the charge is allocated to the matched application in 5345. However, if there are multiple applications listed for the asset, then in 5350 the system determines if weight factors are specified for the multiple applications associated with the asset. If no weight factors are listed in the inventory for the multiple applications associated with the asset, then in 5355 the charge may be allocated based on default weight factors. In one embodiment, the default weight factors may be designed to allocate equal weight across all applications. On the other hand, if weight factors are listed for the applications, then in 5360 the charge is allocated based on the weight factors for each application. In one embodiment of the invention, weight factors may be represented in the form of percentages. Embodiments of the invention also include weight factors that represent maximum charge amounts that can be allocated to an application. For example, each application may have a maximum dollar amount that may be allocated to it, and once that dollar amount has been allocated to the application, the remaining dollar amount may be allocated to the entire organization.

Figure 4:
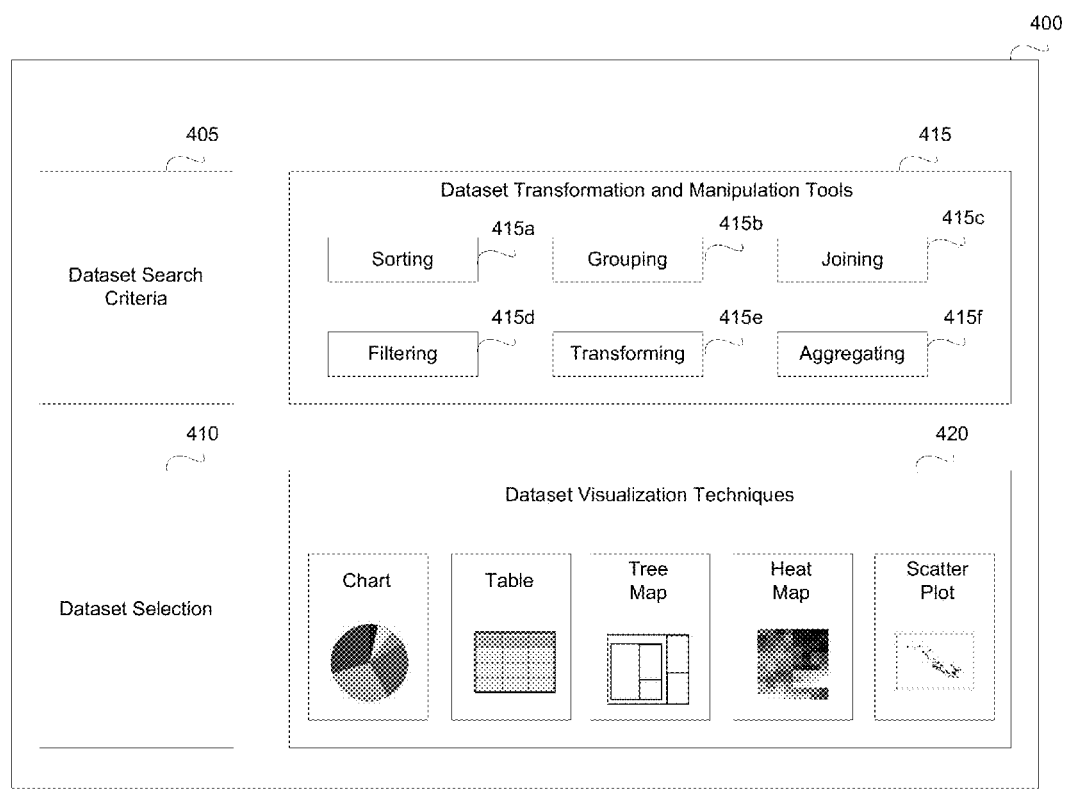
FIG. 4 is a block diagram illustrating an exemplary embodiment of the portal-like solution of the Analytics, Reporting and Data Visualization Engine.

FIG. 4 is a block diagram illustrating an exemplary embodiment of the portal-like solution of the Analytics, Reporting and Data Visualization Engine. The configuration shown in FIG. 4 is merely exemplary and should not be construed as limiting. The portal-like solution 400 may include a Dataset Search Criteria module 405. Examples of criteria for searching datasets include, but are not limited to, dates of dataset records, lines of business, applications, users, departments, regions, etc. Based on the search criteria selected, the portal-like solution 400 may allow the user to select datasets for data visualization using a Dataset Selection module 410. After selecting one or more datasets, a user may utilize Dataset Visualization Techniques 420 to analyze the data. Examples of the data visualization techniques include, but are not limited to, tree maps, heat maps, scatter plot diagrams, pie charts, line graphs, or tables. Furthermore, the portal-like solution 400 may allow users to interactively transform and manipulate the data using the Dataset Transformation and Manipulation Tools 415. The user may be able to interactively perform functions such as, but not limited to, selecting, sorting 415a, grouping 415b, joining 415c, filtering 415d, transforming 415e and aggregating 415f. In one embodiment of the invention, when one data visualization technique is selected, filters, sorts or other dataset transformation and manipulation tools may be added and the user interface may be dynamically updated based on the selections chosen by the user. Embodiment of the invention may also involve interactive selections, sorts, filters, or other dataset transformation and manipulation tools that may be saved and shared by users or across teams. Out of the box templates may also be included and automatically completed and configured at the time of a first processing run.

FIG. 5A is an exemplary embodiment of an output of the present invention. After the ETL Engine 100 and the Data Quality Engine 110 have run, the Charge Processing Engine 120 processes the data to determine the total cost of ownership for each application associated with an asset. FIG. 5A shows the output of the processing of charges associated with an asset 505 (Operating System DK1S234). Once the Charge Processing Engine 120 matches a charge 510 ($10,000.00) and the asset 505 in 5315, it may determine the number of applications associated with the asset in 5340. In the current example, two applications are associated with the asset 505 (Operating System DK1S234): MindyTrade 520 and KaneNet 525. Since the number of applications associated with the asset 505 is greater than one, in 5350 the Charge Processing Engine 120 then determines if weight factors exist for the application MindyTrade 520 and KaneNet 525. In the current example, weight factors are associated with the two applications, with MindyTrade assigned a weight factor of 0.75 (520a) and KaneNet assigned a weight factor of 0.25 (525a). These weight factors may be assigned to reflect the actual usage of the asset by the two applications. Thus, in 5360, the Charge Processing Engine 120 split the charge 510 ($10,000.00) according to the weight factors by allocating $7,500.00 to MindyTrade 520b and $2,500.00 to KaneNet 525b, reflecting the true cost of using the asset 505 (Operating System DK1S234).

FIG. 5B is an exemplary embodiment of an output of the present invention. After the ETL Engine 100 and the Data Quality Engine 110 have run, the Charge Processing Engine 120 processes the data to determine the total cost of ownership for each application associated with an asset. FIG. 5B shows the output of the processing of charges associated with an asset 555 (Operating System DK1W123). Once the Charge Processing Engine 120 matches a charge 560 ($10,000.00) and the asset 555 in 5315, it may determine the number of applications associated with the asset in 5340. In the current example, two applications are associated with the asset 555 (Operating System DK1W123): CarsonMart 570 and DaltonWare 575. Since the number of applications associated with the asset 555 is greater than one, in 5350 the Charge Processing Engine 120 then determines if weight factors exist for CarsonMart 570 and DaltonWare 575. In the current example, there are no weight factors associated with the two applications. Therefore, as per 5355, the Charge Processing Engine 120 may allocate the charge 560 ($10,000.00) based on default weight factors. In the current example, the default weight factors are designed to allocate equal weight across all applications. Thus, in 5355, the Charge Processing Engine 120 allocates $5,000.00 to CarsonMart 570a and $5,000.00 to DaltonWare 575b, reflecting the cost of using the asset 555 (Operating System DK1W123).

Figure 6:
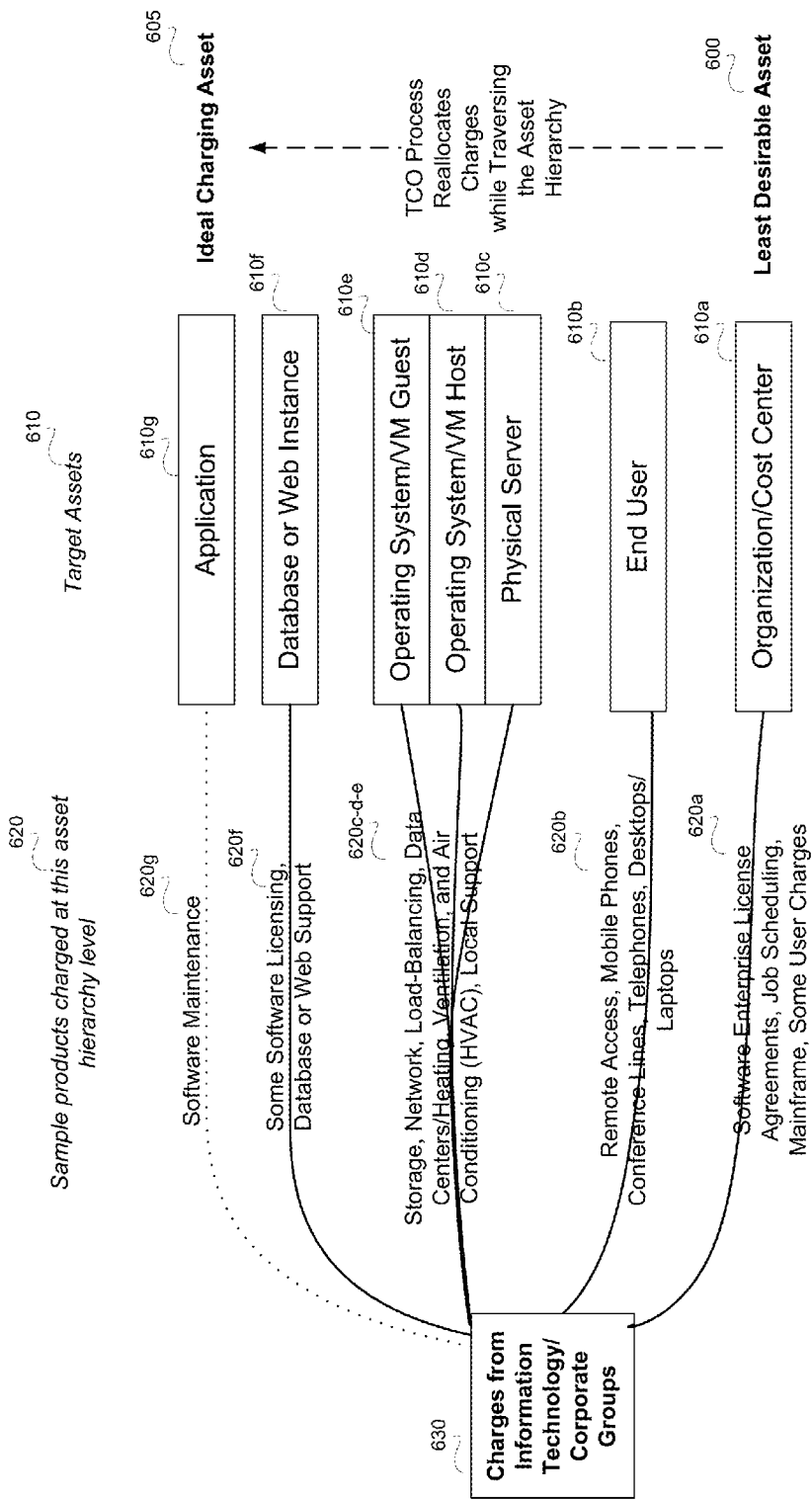
FIG. 6 is an exemplary embodiment of the hierarchical matching criteria utilized by the TCO system.

FIG. 6 is an exemplary embodiment of the hierarchical matching criteria list utilized by the TCO system. The assets may be listed in the order ranging from a least desirable asset 600 to an ideal charging asset 605. The target assets 610 to which the charges are to be matched may be an Organization/Cost Center 610a, an End User 610b, a Physical Serve 610c, an Operating System/Virtual Machine Host 610d, an Operating System/Virtual Machine Guest 610e, a Database or Web Instance 610f or an Application 610g. The sample products charged at each of the asset hierarchy levels may be: Software Enterprise License Agreements, Job Scheduling, Mainframe, Some User Charges 620a at the Organization/Cost Center 610a level, Remote Access, Mobile Phones, Conference Lines, Telephones, Desktops/Laptops 620b at the End User 610b level, Storage, Network, Load-Balancing, Data Centers/Heating, Ventilation, and Air Conditioning (HVAC), Local Support 620c-d-e at the Physical Serve 610c, the Operating System/Virtual Machine Host 610d, the Operating System/Virtual Machine Guest 610e levels, some Software Licensing, Database or Web Support 620f at the Database or Web Instance 610f level, and Software Maintenance 620g at the Application 610g level. The details of the charges may be gathered from the IT or Corporate groups of an organization. Based on this embodiment of the hierarchical matching criteria, application or business-aligned charges may be most relevant. The Charge Processing Engine 120 may use this hierarchical matching criteria to dynamically reallocate charges by utilizing whatever information is known about the asset charged in order to allocate the IT cost to the asset that is closest to the business or business process. In an embodiment of the invention, the Charge Processing Engine 120 traverses the hierarchical matching criteria by starting from the Least Desirable Asset 600 and moving up the hierarchy to the Ideal Charging Asset 605. The Charge Processing Engine 120 may allocate the charge to the asset at the highest level in the asset hierarchy. Embodiments of the invention may also involve traversing the hierarchical matching criteria by starting from the Ideal Charging Asset 605 and moving down the hierarchy to the Least Desirable Asset 600. The Charge Processing Engine 120 may allocate the charge to the asset at the lowest level in the asset hierarchy.

FIG. 7A is an exemplary embodiment of the hierarchical matching criteria utilized by the TCO system. The hierarchical matching criteria 705 may contain the following IT asset configurable items: Application 705a, Database or Web Instance 705b, Operating System/Virtual Machine Guest 705c, Operating System/Virtual Machine Host 705d and Physical Server 705e. In an embodiment of the invention, the Charge Processing Engine 120 may allocate charges to assets in the hierarchical matching criteria 705 list by traversing the hierarchy from the bottom up, that is, from the Physical Server 705e to the Application 705a. In another embodiment of the invention, the Charge Processing Engine 120 may allocate charges to assets in the hierarchical matching criteria 705 list by traversing the hierarchy from the top down, that is, from the Application 705a to the Physical Server 705e.

FIG. 7B is an exemplary embodiment of the hierarchical matching criteria utilized by the TCO system. The hierarchical matching criteria 710 may contain the following business asset configurable items: Individual (employee/staff member) 710a, Manager 710b, Team 710c, Line of Business 710d, Business Unit (distribution, equity, retail, etc.) 710e, Department 710f, Division 710g and Region (Americas, Europe/Middle East/Africa, Asia Pacific, etc.) 710h. In an embodiment of the invention, the Charge Processing Engine 120 may allocate charges to assets in the hierarchical matching criteria 710 list by traversing the hierarchy from the bottom up, that is, from the Region 710h to the Individual (employee/staff member) 710a. In another embodiment of the invention, the Charge Processing Engine 120 may allocate charges to assets in the hierarchical matching criteria 710 list by traversing the hierarchy from the top down, that is, from the Individual (employee/staff member) 710a to the Region 710h.

FIG. 7C is an exemplary embodiment of the hierarchical matching criteria utilized by the TCO system. The hierarchical matching criteria 715 may contain a combination of the following IT and business asset configurable items: Application 715a, Operating System 715b, Physical Server 715c, User 715d, Business Unit (distribution, equity, retail, etc.) 715e, Department 715f, Region (Americas, Europe/Middle East/Africa, Asia Pacific, etc.) 715g and Line of Business 715h. In an embodiment of the invention, the Charge Processing Engine 120 may allocate charges to assets in the hierarchical matching criteria 715 list by traversing the hierarchy from the bottom up, that is, from the Line of Business 715h to the Application 715a. In another embodiment of the invention, the Charge Processing Engine 120 may allocate charges to assets in the hierarchical matching criteria 715 list by traversing the hierarchy from the top down, that is, from the Application 715a to the Line of Business 715h.

As described above, embodiments of the system of the invention and various processes of embodiments are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The invention claimed is:

1. A computing system for determining a cost of ownership of at least one asset, the system obtaining charge and asset information from at least one external system over a network, the system comprising:
    a computer memory storing instructions including an extract, transform and load engine, a charge processing engine, a data quality engine, a charge processing engine, and an analytics, reporting, and data visualization engine; and
    at least one computer processor executing the stored instructions to perform steps including:
        importing data using the extract, transform and load engine, the data including charge and asset information from the at least one external system,
        validating the imported data using the data quality engine,
        processing the data with the charge processing engine by matching at least one charge to at least one asset, and
        performing data analytics and reporting on the total cost of ownership of the at least one asset by presenting a user interface with the analytics, reporting and data visualization engine.

2. The system of claim 1, wherein the Extract, Transform and Load Engine comprises at least one of a file upload utility and a web services interface.

3. The system of claim 1, wherein the extract, transform and load engine comprises at least one of an Open Database Connectivity interface, a Java Database Connectivity interface, a Relational Database Management System interface, a Hadoop/Hadoop Data File System interface, a Configuration Management System interface and an IT Asset Management System interface.

4. The system of claim 1, wherein the extract, transform and load engine comprises a user interface for configuring the extract, transform and load engine.

5. The system of claim 1, wherein the extract, transform and load engine comprises at least one of a data archiving processor to dynamically move data to archive tables, a job scheduler to manage jobs, schedules and statuses and a data metric processor for gathering data metrics.

6. The system of claim 1, wherein the data quality engine comprises a data learning module to learn and improve recommendation of the data.

7. The system of claim 1, wherein the data quality engine comprises a job failure management module to identify and mark data sets as unfit for import.

8. The system of claim 1, wherein the analytics, reporting and data visualization engine further comprises at least one of a standard report, a customized report, an ad-hoc report and an interface for a third party reporting solution.

9. The system of claim 1, wherein the analytics, reporting and data visualization engine further comprises a portal component to visualize and analyze data.

10. The system of claim 1, further comprising processing the imported data by traversing an asset hierarchy, the asset hierarchy having multiple levels of assets spanning from a bottom level to a top level, wherein traversing the asset hierarchy includes matching a received charge with a highest possible asset level based on the imported data and allocating the charge to the highest asset level reached.

11. The system of claim 1, further comprising processing the imported data by traversing an asset hierarchy, the asset hierarchy having multiple levels of assets spanning from a top level to a bottom level, wherein traversing the asset hierarchy includes matching a received charge with a lowest possible asset level based on the imported data and allocating the charge to the lowest asset level reached.

12. The method of claim 10, wherein the assets in the asset hierarchy are IT assets.

13. The method of claim 11, wherein the assets in the asset hierarchy are IT assets.

14. The method of claim 10, wherein the assets in the asset hierarchy are business assets.

15. The method of claim 11, wherein the assets in the asset hierarchy are business assets.

16. A computer-implemented method for determining the cost of ownership of at least one asset, the method obtaining charge and asset information from at least one external system over a network, the method comprising:
    storing instructions in at least one computer memory, the instructions including an extract, transform and load engine, a charge processing engine, a data quality engine, a charge processing engine, and an analytics, reporting, and data visualization engine; and
    implementing a computer processor for accessing the stored instructions in the computer and executing the instructions to performs steps including:
        importing data using the extract, transform and load engine, the data including charge and asset information from the at least one external system,
        validating the imported data using the data quality engine, and
        processing the data with the charge processing engine by matching at least one charge to at least one asset.

17. The method of claim 16, wherein bringing data from disparate sources comprises providing at least one of a file upload utility and a web services interface.

18. The method of claim 16, wherein bringing data from disparate sources comprises providing at least one of an Open Database Connectivity interface, a Java Database Connectivity interface, a Relational Database Management System interface, a Hadoop/Hadoop Data File System interface, a Configuration Management System interface and an IT Asset Management System interface.

19. The method of claim 16, wherein bringing data from disparate sources comprises providing a user interface for configuring the extract, transform and load engine.

20. The method of claim 19, wherein the user interface is web based and comprises at least one of a portal component, an applet and a shuttle control.

21. The method of claim 16, wherein bringing data from disparate sources comprises at least one of a data archiving processor to dynamically move data to archive tables, a job scheduler to manage jobs, schedules and statuses and a data metric processor for gathering data metrics.

22. The method of claim 16, wherein validating the data comprises learning and improving recommendation of the data.

23. The method of claim 16, wherein validating the data comprises providing a job failure management module to identify and mark data sets as unfit for import.

24. The method of claim 16 further comprising performing data analytics and reporting on the total cost of ownership of the at least one asset by presenting a user interface with the analytics, reporting and data visualization engine.

25. The method of claim 24, wherein performing data analytics and reporting on the total cost of ownership comprises providing at least one of a standard report, a customized report, an ad-hoc report and an interface for a third party reporting solution.

26. The method of claim 24, wherein performing the data analytics and reporting on the total cost of ownership comprises providing a portal component to visualize and analyze data.

27. The method of claim 16, further comprising processing the imported data by traversing an asset hierarchy, the asset hierarchy having multiple levels of assets spanning from a bottom level to a top level, wherein traversing the asset hierarchy includes matching a received charge with a highest possible asset level based on the imported data and allocating the charge to the highest asset level reached.

28. The method of claim 16, further comprising processing the imported data by traversing an asset hierarchy, the asset hierarchy having multiple levels of assets spanning from a top level to a bottom level, wherein traversing the asset hierarchy includes matching a received charge with a lowest possible asset level based on the imported data and allocating the charge to the lowest asset level reached.

29. The method of claim 27, wherein the assets in the asset hierarchy are IT assets.

30. The method of claim 28, wherein the assets in the asset hierarchy are IT assets.

31. The method of claim 27, wherein the assets in the asset hierarchy are business assets.

32. The method of claim 28, wherein the assets in the asset hierarchy are business assets.

33. A computing system for determining a cost of ownership of at least one asset, the system obtaining charge and asset information from at least one external system over a network, the system comprising:
- a computer memory storing instructions including an extract, transform and load engine, a charge processing engine, a data quality engine, a charge processing engine, and an analytics, reporting, and data visualization engine; and
- at least one computer processor executing the stored instructions to perform steps including:
    - importing data using the extract, transform and load engine, the data including charge and asset information from the at least one external system, the extract, transform and load engine including
        - data import tools including a file upload utility, a web services interface, an Open Database Connectivity interface, a Java Database Connectivity interface, a Relational Database Management System interface, a Hadoop/Hadoop Data File System interface, a Configuration Management System interface and an IT Asset Management System interface,
        - a user interface for configuring the extract, transform and load engine,
        - a data archiving processor to dynamically move the data to at least one archive table,
        - a job scheduler to manage jobs, schedules and statuses, and
        - a data metric processor for gathering data metrics,
    - validating the imported data using the data quality engine, the data quality engine including a data learning module to identify and mark data sets as unfit for import,
    - processing the data with the charge processing engine by matching at least one charge to at least one asset, the charge processing including
        - storing an asset hierarchy, the asset hierarchy having multiple levels of assets arranged in a predetermined manner,
        - processing the imported data by traversing the asset hierarchy, and
        - allocating the charge to the asset, and
    - performing data analytics and reporting on the total cost of ownership of the at least one asset by presenting a user interface with the analytics, reporting and data visualization engine, the analytics, reporting and data visualization engine including
        - a reporting module comprising of at least one of a standard report, a customized report, an ad hoc report and an interface for third party reporting solution, and
        - a portal component to visualize and analyze the data.

* * * * *